United States Patent
Raubuch

(10) Patent No.: US 9,158,539 B2
(45) Date of Patent: Oct. 13, 2015

(54) ENHANCED PRECISION SUM-OF-PRODUCTS CALCULATION USING HIGH ORDER BITS REGISTER OPERAND AND RESPECTIVE LOW ORDER BITS CACHE ENTRY

(75) Inventor: Martin Raubuch, Baldham (DE)

(73) Assignee: RACORS GmbH, Baldham (DE)

( * ) Notice: Subject to any disclaimer, the term of this patent is extended or adjusted under 35 U.S.C. 154(b) by 840 days.

(21) Appl. No.: 13/499,836

(22) PCT Filed: Nov. 30, 2009

(86) PCT No.: PCT/EP2009/008522
§ 371 (c)(1),
(2), (4) Date: Apr. 2, 2012

(87) PCT Pub. No.: WO2011/063824
PCT Pub. Date: Jun. 3, 2011

(65) Prior Publication Data
US 2012/0198212 A1    Aug. 2, 2012

(51) Int. Cl.
G06F 9/302 (2006.01)
G06F 9/30 (2006.01)
G06F 7/499 (2006.01)
G06F 7/544 (2006.01)

(52) U.S. Cl.
CPC ........ *G06F 9/30014* (2013.01); *G06F 7/49942* (2013.01); *G06F 7/5443* (2013.01); *G06F 9/30112* (2013.01); *G06F 9/30138* (2013.01)

(58) Field of Classification Search
CPC . G06F 7/5443; G06F 9/3001; G06F 9/30014; G06F 9/30138; G06F 9/30101; G06F 7/4876; G06F 7/523
See application file for complete search history.

(56) References Cited

U.S. PATENT DOCUMENTS

| | | | | |
|---|---|---|---|---|
| 5,579,253 | A * | 11/1996 | Lee et al. | 708/625 |
| 5,764,553 | A | 6/1998 | Hong | |
| 5,880,983 | A | 3/1999 | Elliott et al. | |
| 2002/0116432 | A1 | 8/2002 | Strjbaek et al. | |
| 2002/0178203 | A1 | 11/2002 | Stribaek et al. | |
| 2004/0078549 | A1* | 4/2004 | Tanaka et al. | 712/22 |
| 2004/0267857 | A1 | 12/2004 | Abel et al. | |
| 2007/0055847 | A1* | 3/2007 | Nagase et al. | 712/220 |
| 2008/0313429 | A1* | 12/2008 | Morikawa et al. | 712/34 |

OTHER PUBLICATIONS

International Search Report dated Nov. 2, 2010 (five (5) pages).

* cited by examiner

*Primary Examiner* — Kenneth Kim
(74) *Attorney, Agent, or Firm* — Crowell & Moring LLP

(57) ABSTRACT

A microprocessor, a method for enhanced precision sum-of-products calculation and a video decoding device are provided, in which at least one general-purpose-register is arranged to provide a number of destination bits to a multiply unit, and a control unit is adapted to provide at least a multiply-high instruction and a multiply-high-and-accumulate instruction to the multiply unit. The multiply unit is arranged to receive at least first and second source operands having an associated number of source bits, a sum of source bits exceeding the number of destination bits, connected to a register-extension cache comprising at least one cache entry arranged to store a number of precision-enhancement bits, and adapted to store a destination portion of a result operand in the general-purpose-register and a precision enhancement portion in the cache entry. The result operand is generated by a multiply-high operation or by a multiply-high-and-accumulate operation, depending on the received instructions.

10 Claims, 4 Drawing Sheets

ENHANCED PRECISION SUM-OF-PRODUCTS CALCULATION USING HIGH ORDER BITS REGISTER OPERAND AND RESPECTIVE LOW ORDER BITS CACHE ENTRY

FIELD OF THE INVENTION

This invention in general relates to processing devices and more specifically to a microprocessor, a method for enhanced precision sum-of-products calculation on a microprocessor, and a video decoding device.

BACKGROUND OF THE INVENTION

In digital signal processing applications one of the most frequently used functions is the sum-of-products:

$$SoP(S_i, C_i, n) = \sum_{i=1}^{n-1} S_i \cdot C_i$$

wherein SoP is Sum of Products, n is number of products, i is a counter value, $S_i$ is the $i^{th}$ of n samples of a quantized signal, and $C_i$ is the $i^{th}$ of n coefficients (e.g. filter or transformation coefficients).

DSPs (Digital Signal Processors) and also some standard microprocessors have dedicated instructions for fast and efficient sum-of-products calculations. A very commonly used instruction is a "MAC" (Multiply-and-Accumulate) instruction which combines the inner loop multiply and add operation into a single instruction.

Operands of microprocessor instructions are represented by a limited number of bits. The limit is defined by the register width of the microprocessor hardware. For integer operands this limit defines the maximum range of values that can be represented. In digital signal processing operands represent quantized analog signals and the operand size limit defines the precision or in other words the quality of the analog signal approximation.

As an example, general purpose microprocessors very often have the same size limit for source and destination operands, set by the width of their general purpose registers. For example, microprocessor architectures that follow modern RISC (Reduced Instruction Set Computer) concepts may have a large set of equally sized general purpose registers being used for the source and destination operands of compute instructions.

Multiplying two integer numbers with n bits size generates a product of 2·n bits size for unsigned numbers and a product of 2·n−1 bits size for signed numbers. Depending on the source operand sizes results of multiply instructions may not fit completely in a general purpose register having the same size as the source register. By adding up a sequence of products, sum-of-products calculations may generate result operands having even more bits than a single product. For example, a sum-of-product calculation with n=16, and $S_i$, $C_i$ being signed 16-bit values generates a product of 2·16−1+4=35 bits size.

A common type of multiply instruction found in the instruction sets of many general purpose microprocessors contains storing the low order bits of the product in the destination register. This type of multiply instruction is often used to support high level languages, but is not very well suited for DSP computations. The results of multiply instructions and of sum-of-products calculations can overflow. For DSP computations, "multiply-high" instructions that store the high order bits of the product may be used. The results of single multiply instructions cannot overflow. However, precision of the result operand is reduced because the low order bits of products are discarded.

With increasing gate density and associated decreasing cost of digital circuits, some modern general purpose microprocessors provide fast multiply operations and in principle could be used also for applications typically executed on a DSP. However, due to the width of destination registers the precision of sum-of-product calculations remains limited.

DSPs are a special class of microprocessors. Typically DSPs contain accumulator registers with an extended width to avoid loss of precision in single product and sum-of-products calculations. In general purpose control and compute applications the extended width registers of DSPs provide only little benefit. Additionally, the irregular register sizes and different sizes of source and destination operands and registers complicate the programming model or register set and limit the efficiency (code density and performance) of DSPs in general purpose control and compute programs.

Hence, general purpose microprocessors may not be very well suited for DSP applications and DSPs may not be very well suited for general purpose control and compute applications. For applications with mixed requirements microprocessor architectures with high efficiency and performance in both categories would be beneficial.

However, general purpose microprocessors may be used for DSP algorithms despite the precision versus register size problem.

An example approach suitable for most general purpose microprocessors, source operand sizes may be chosen small. By using source operands of small size (bit width) the results of sum-of-products calculation may be prevented from overflowing. For example, in video or graphics applications, samples are typically 8 to 12 bit values and coefficients 12 to 16 bit values. The length n of sum-of-products calculations for video/graphics is small, in the range of 2 to 8. For example, a processor with 32-bit registers can correctly calculate sum of products of this type. However, resource efficiency is low when using 32·32-bit multiplications, since in video/graphics applications typical output samples have 8-bit precision and for intermediate calculations 16 to 20 bits are sufficient.

Using multiply-high instructions is another example approach provided by some microprocessors having additional multiply instructions that store the high order bits of products in the destination register. This concept is also used for MAC (Multiply-and-Accumulate) instructions. With this concept, operands are treated as fixed point numbers with the decimal point left of the most significant bit. In principal this is approach may be used for DSP algorithms. For small operands, the data paths (multipliers, registers, Arithmetic Logic Unit (ALU)) can be split into multiple smaller pieces to enable SIMD (Single Instruction Multiple Data) operations. However, the least significant bits of products that must be calculated anyway to obtain the most significant bits are discarded and do not contribute to the precision of sum-of-product calculations.

Yet another approach is based on two concatenated general purpose registers for multiply/MAC destination operands, which may be a typical solution for many DSP algorithms. However, the available number of destination registers is reduced by half.

In US 2002/0178203 A1 it is shown that instead of using general-purpose-registers, additional dedicated accumulator registers may be used. The programming model for the microprocessor may include one or more dedicated accumulator registers for extended precision sum-of-product calculations. To make use of the extended precision special Multiply and MAC instructions are provided that specify an accumulator register as destination. At the end of a sum-of-products sequence a separate instruction transfers the accumulator content (typically with optional shifting, rounding and clipping) to a general purpose register. However, extra instructions are required at the end of sum-of-product sequences to transfer the accumulator content to a general purpose register. This decreases performance, especially for short sequences. The programming model of the processor becomes more complex and the opcode map, i.e. the map for the portions of a machine language instruction that specify the operation to be performed, requires extra space for the multiply and MAC instructions that specify an accumulator

SUMMARY OF THE INVENTION

It is an object of the invention to enable improved precision calculations on a general purpose microprocessor.

According to the presented invention, a microprocessor, a method for enhanced precision sum-of-products calculation on a microprocessor, and a video decoding device as described in the accompanying claims are provided. Dependent claims relate to specific embodiments. These and other aspects of details of the invention are shown by means of example with reference to the embodiments described below.

BRIEF DESCRIPTION OF THE DRAWINGS

In the figures, identical reference numbers relate to identical or similar elements.

DETAILED DESCRIPTION OF THE PREFERRED EMBODIMENTS

The embodiments of the present invention described below may completely or at least partially be implemented using electronic devices known to a person skilled in the art. Details will be omitted if not considered necessary for understanding the underlying inventive concepts as illustrated below.

Figure 1:
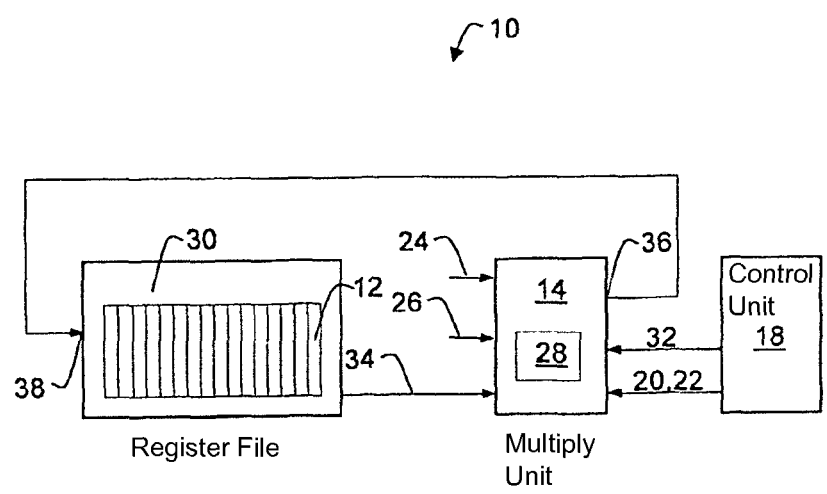
FIG. 1 shows a schematic example embodiment of a microprocessor according to the invention.

Referring to FIG. 1, an example of an embodiment of a microprocessor according to the invention is shown. For simplicity of the description and drawing other units like ALU, load/store unit, etc. known to the person skilled in the art are not shown. The microprocessor 10 comprises at least one general-purpose-register 12 arranged to store and provide a number of destination bits to a multiply unit 14; a control unit 18 adapted to provide at least a multiply-high (MULH) instruction 20 and a multiply-high-and-accumulate (MACH) instruction 22 to the multiply unit. The multiply unit 14 is further arranged to receive at least a first and a second source operand 24, 26, each having an associated number of source bits and a sum of the associated numbers of source bits exceeding the number of destination bits; connected to a register-extension cache 28 comprising at least one cache entry arranged to store and provide a number of precision-enhancement bits; and adapted to store a destination portion of a result operand in the general-purpose-register 12 and a precision-enhancement portion of the result operand in the cache entry. The result operand is generated by a multiply-high operation when receiving the multiply-high (MULH) instruction 20 and by a multiply-high-and-accumulate operation when receiving the multiply-high-and-accumulate (MACH) instruction 22.

No separate accumulation register may be used. Therefore, the presented system may not comprise dedicated multiply/MACH instructions needed that specify a separate accumulator register as destination, saving opcode space and simplifying instruction decoding.

For a general purpose microprocessor the ISA (Instruction Set Architecture) and programming model may be kept simple and regular, therefore making the construction of high level language compilers easy. It may also help new users to get quickly familiar with the architecture which improves their productivity. The presented microcontroller is arranged to hide the complexity of the extra functionality. ISA and programming model may not be extended with additional registers or instructions. Users that need no extended precision DSP functionality do not need to know about the existence of the register extension cache and its functionality.

The presented microprocessor may be any processing device. Preferably it may be a general purpose microprocessor, for example a microprocessor that comprises multiple, equally sized general purpose registers for source and destination operands.

Instruction sequences for sum-of-product calculations may start with a MULH instruction followed by a series of MACH instructions. With the shown concept extended precision may be achieved for sum-of-product instruction sequences that start with a multiply-high instruction and are followed by a series of MACH instructions all using the same destination register 12. No extra instruction may be needed at the end of a sum-of-product sequence to transfer the result to a general purpose register, therefore improving performance.

The destination portion of the result operand may comprise the high order bits that are written in the specified general purpose destination register 12. The precision-enhancement portion of the result operand may be low order bits of the result and may be stored in a cache entry of the register extension cache 28.

The multiply unit 14 may receive at least a first and a second source operand 24, 26 via at least one input. The multiply unit 14 may comprise a dedicated input for each of the source operands. However, source operands may be provided sequentially using the same input or the first and second source operand may be the same source operand. It is also within the scope of the described system that a source operand has a fixed constant value or that multiplication is performed using more than two source operands.

The sum of the associated numbers of source bits exceeding the number of destination bits is a sum that is greater than the number of destination bits.

In the example embodiment shown in FIG. 1, the processor section comprises a register file 30 with 16 general purpose registers of for example 32-bit width. The presented example use specific values e.g. for the general purpose register width and for the number of general purpose registers. The invention is not limited to these specific values. A 32-bit read port 34 of the register file 30 is connected to a multiply unit 14 which contains the register extension cache 28. The multiply unit receives two 32-bit source operands 24, 26. The 32-bit output 36 of the multiply unit 14 is connected to a 32-bit write port 38 of the register file 30. A 4-bit output port of the control unit 18 is connected to the multiply unit 14 and may signal a 4-bit destination identifier 32 of result operands of MULH and MACH instructions to the multiply unit 14. For each MULH/MACH operation this 4-bit ID 32 may define which of the 16 general purpose registers 12 of the register file 30 may be used as destination. A second output of the control unit 18 may be connected to the multiply unit 14 and may signal whether to execute a MULH or a MACH instruction 20, 22.

When a MULH instruction 20 is executed in the shown example, the multiply unit 14 may calculate the result operand as a 64-bit product of the source operands 24 and 26. The destination portion, i.e. the 32 high order bits of the 64-bit product are output through port 36 of the multiply unit 14 and are written into the specified 32-bit destination register 12 of the register file 30 through the 32-bit write port 38. The 32 low order bits of the 64-bit product are written into an entry of the register extension cache 28. The 4-bit ID of the destination register received from the control unit 18 may for example be stored in the register extension cache 28 as tag of the same cache entry.

The multiply-high-and-accumulate (MACH) operation may comprise generating the result operand using a sum of an intermediate result operand generated from a multiply-high (MULH) operation using the at least first and second source operands 24, 26 and a concatenation of a preceding destination portion previously stored in the at least one general-purpose-register 12 and a corresponding preceding precision-enhancement portion previously stored in the at least one cache entry. When executing a MACH operation, full precision for the result operand may be achieved by adding the result of the multiply to the concatenation of the content of the destination register 12 comprising the high order (or destination) bits and the cache entry comprising low order (or precision enhancement) bits.

When any other instruction is executed (except instructions for control and maintenance) the content of the register extension cache 28 may not be changed.

The sum of the associated numbers of source bits may equal a sum of the number of destination bits and the precision-enhancement bits, therefore the cache entry being configured to store all precision enhancement bits. In another embodiment the sum of the associated numbers of source bits may exceed a sum of the number of destination bits and the precision-enhancement bits. A smaller width may cut off a portion of the least significant bits of the extension. This may allow reducing the cache entry size, therefore saving die area, while allowing meeting a predefined target precision requirement.

However, a larger width is also within the scope of this invention and may be useful for algorithms where sum-of-product calculations can overflow. Using MULH and MACH instructions that perform an additional right-shift before the accumulation step an overflow may be avoided. For example with an 8-bit right-shift and 8 bits added as least significant bits of the register extension sums of up to 256 products cannot overflow and are calculated with the maximum possible precision with respect to the source operands.

And the at least two source operands may not have the same width as the destination register. The examples show a typical case where the maximum width of the source operands is equal to the width of the destination registers. The two source operands may be received from a register, from memory or can be constants and can have any width, smaller or larger than the destination register. The two source operands may or may not have the same width.

The number of bits, i.e. the bit-width used in the examples for the multiplier output is for unsigned or mixed sign multiplies where the width of the product is the sum of the input operand width. The invention is not limited to this width relation.

The microprocessor 10 may comprise a plurality 30 of general-purpose-registers 12, each having a register identifier and wherein the control unit 18 may be adapted to provide a destination identifier 32 matching one of the register identifiers to the multiply unit 14, the multiply unit adapted to store the destination portion in the general-purpose-register 12 identified by the destination identifier 32. The plurality 30 of general-purpose-registers may for example be provided as the register file. This may allow selecting an available general-purpose register. General purpose registers may also be used for providing source operands to the multiply unit.

And the register-extension cache 28 may comprise a plurality of the cache entries, each identified using a cache entry identifier corresponding to one of the register identifiers (i.e. cache entries may be tagged with the identifier, e.g. register number of the destination register) and wherein the multiply unit 14 is adapted to generate the result operand using the destination portion and a precision enhancement portion provided by a cache entry having the cache entry identifier matching the destination identifier 32.

A cache entry identifier may be referred to as corresponding to a particular register identifier, if identifiers are identical or uniquely connected with each other.

The register extension cache 28 may comprise a cache entry for each of the general-purpose registers 12. However, less cache entries may be used and cache entry identifiers may be assigned dynamically. This may allow reducing the number of cache entries and therefore cache size to a minimum, for example corresponding to a maximum or average of expected sum-of-product calculations concurrently executed.

When a MACH instruction is executed in the shown example, the multiply unit 14 receives the 32-bit value of the specified destination register from the read port 34 of the register file 30. The multiply unit may calculate the result operand, i.e. the 64-bit product of the two 32-bit source operands 24, 26.

The four bit destination ID provided by the control unit 18 through output signal 32 may be compared with the destination IDs of all valid cache entries of the register extension cache 28.

When a MACH instruction is executed the register extension cache may be checked for a hit (entry with the same destination register ID). In case of a cache hit the full precision result of the multiplication is added to the concatenation of the destination general purpose register 12 holding the high order bits and the cache entry holding the low order bits. In the shown example, in case of a hit (matching destination ID found), result operand, i.e the 64-bit product may be added to the concatenation of the 32-bit value from the matching register extension cache entry (low order bits of the concatenation) and the 32-bit value from the destination register (high order bits of the concatenation). The 32 low order bits of the result may then be stored in the matching entry of the register extension cache 28. The destination ID of the matching cache entry may not be changed. The 32 high order bits of the result may be output through port 36 of the multiply unit 14 and written into the 32-bit destination register of the register file 30 through the 32-bit wide write port 38.

The high order bits of the result operand, i.e. the accumulation result are stored in the corresponding destination register. The low order bits are stored in the cache entry with the hit. In case of a miss (no matching ID found), the destination portion, i.e. in the presented example the 32 high order bits of the product may be added to the value from the destination register 12 and the 32-bit result is output through port 36 of the multiply unit 14 and written into the 32-bit destination register 12 of the register file 30 through the 32-bit wide write port 38. Hence, in case of a cache miss of a MACH operation the destination portion of the result operand, i.e. the high order bits of the multiply result may be added to the destination register whereas the low-order bits may be discarded.

A single cache entry may be sufficient if sum-of-product sequences are not interrupted by other (after the first) multiply-high instructions. A register extension cache 28 with multiple entries may enable interleaving of instructions of multiple sum-of-product sequences.

The multiply-high-operation may comprise a multiply-high-and-negate operation and the multiply-high-and-accumulate operation may comprise a multiply-high-negate-and-accumulate operation. The two variants with the "negate" option may for example relate to DSP algorithms where samples or constants may be used with both positive and negative signs. Having both instruction variants saves an extra instruction to obtain the value with the opposite sign.

As shown in FIG. 1 the multiply unit 14 may comprise the register-extension cache 28. This may allow for saving die area for a separate cache and connecting lines. However, the register extension cache may not be comprised in the multiply unit of the microprocessor. It can be located in any other unit or can also be a separate unit.

And the multiply-high operation and the multiply-high-and-accumulate operation may be implemented as Single Instruction Multiple Data operations. Many microprocessors may have SIMD (Single Instruction Multiple Data) instructions that split the data path elements (such as registers, ALU, multipliers) into multiple smaller pieces. This may increase performance of video and graphics algorithms where for example 16-bit resolution is sufficient. For such processor architectures, extension registers for each way (vector component) may be used. Processors with 32-bit registers may double their performance by using 2-way SIMD instructions. Processors with 64-bit registers may quadruple their performance by using 4-way SIMD instructions.

Figure 2:
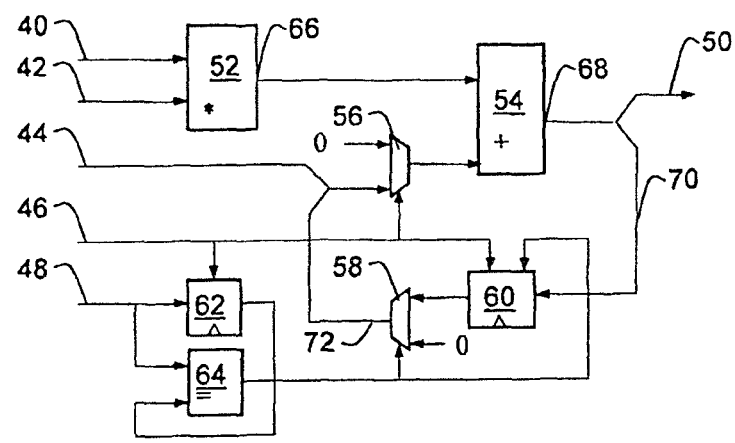
FIG. 2 shows a schematic example embodiment of a multiply unit of a microprocessor according to the invention.

Referring now also to FIG. 2, an example of an embodiment of a multiply unit 14 of a microprocessor 10 according to the invention is shown. FIG. 2 shows an example implementation of a multiply unit with a single entry register extension cache 28. For simplicity of the description and drawing no pipeline registers and only I/O signals and data paths that may be relevant for the invention are shown with the multiply unit. Similar to the example given with FIG. 1, specific values are used for the source and destination operand widths (32 bits) and for the width of the destination ID (4 bits to address 16 general purpose registers for the source and destination operands). However, it should be noted that these are example values and may easily be changed.

The shown example multiply unit may comprise two 32-bit input signals 40, 42 as the source operands for multiplies. A third 32-bit input signal 44 may be the value of the destination register before an operation. It is may be used as source operand for MACH operations. Input signal 46 may be a control signal. It may determine whether the example multiply unit performs a MULH or a MACH operation. The 4-bit input signal 48 may be the destination ID. The shown multiply unit may generate a 32-bit output value 50.

In the shown example, the multiply unit contains the following components: a 32·32-bit multiplier 52 that calculates a 64-bit product 66; a 64-bit adder 54; a 64-bit, 2-input multiplexer 56; a 32-bit, 2-input multiplexer 58; a 32-bit register 60 which may be the extension cache register; a 4-bit register 62; a 4-bit equality comparator 64. In the example shown in FIG. 2, the components of the example multiply unit are connected in the following way: the multiplier 52 receives the two 32-bit input values 40 and 42. The adder 54 receives the output 66 of the multiplier 52 and the output of multiplexer 56. The 64-bit output 68 of the adder is split into the 32 high order bits 50 and the 32 low order bits 70. The 32 high order bits are the output signal 50 of the multiply unit. The 64-bit, 2-input multiplexer 56 receives a constant zero value on the first input. The second 64-bit input receives input signal 44 as the 32 high order bits and the output 72 of multiplexer 58 as the 32 low order bits. The 32-bit register 60 receives the 32 low order bits 70 of the output 68 of the adder 54. The 4-bit register 62 receives the 4-bit input signal 48. The 32-bit, 2-input multiplexer 58 receives the 32-bit output of register 60 as first input and a constant zero value as the second input. The 4-bit equality comparator 64 receives the 4-bit input value 48 as first input and the output of register 62 as the second input. The output of the comparator is connected to the select input of multiplexer 58. The control input signal 46 is connected to the select input of multiplexer 56, to the enable input of register 62 and to the first enable input of register 60.

Registers 60 and 62 are the only storage elements of the example multiply unit and store the tag and data parts of the single cache entry. The other components may be combinatorial. Driven by a clock signal (not shown) the two registers take new values only at the end of an operation and only if their enable inputs are asserted. Register 62 has a single enable input which is driven by the control input 46. Register 60 has two enable inputs in an OR configuration. It is enabled if either control input 46 is asserted or if the output of the comparator 64 indicates that input 48 and the value of register 62 are equal.

The presented example multiply unit may perform at least three types of operations. Which of the three operations is performed is controlled by the input signal 46 and by the output of the comparator circuit 64.

Type 1 operation is performed when a MULH instruction is executed. The control input 46 selects the constant zero input of the multiplexer 56 and enables the update of registers 60 and 62 at the end of the operation. Input value 44 is ignored (not needed). The output of the comparator 64 is ignored (not needed). The adder 54 adds zero to the 64-bit output 66 of the multiplier 52. The output 68 of the adder is equal to the output 66 of the multiplier 52. The output 50 is the 32 high order bits of output 68 which are equal to the 32 high order bits of the multiplier output 66. At the end of the operation, the 32 low order bits 70 of the adder output 68 which are equal to the 32 low order bits of the multiplier output 66 are stored in register 60. The 4-bit destination ID 48 is stored in register 62.

Type 2 operation is performed when a MACH instruction is executed and if the 4-bit input value 48 and the value of the 4-bit register 62 are different, i.e. in the event of a cache miss. The output of the comparator 64 selects the constant zero input of multiplexer 58 and together with input 46 disables the update of register 60 (both enable inputs are de-asserted). The control input 46 disables the update of register 62 and selects the second input of multiplexer 56 which is the concatenation of input signal 44 and the output 72 of multiplexer 58. The adder 54 adds the 32-bit input signal 44 to the 32 high order bits of the multiplier output 66. The 32 high order bits of the result 68 are the output value 50.

Type 3 operation is performed when in the presented example a MACH instruction is executed and if the 4-bit input value 48 and the value of the 4-bit register 62 are equal, i.e. in the event of a cache hit. The output of the comparator 64 selects the first input of multiplexer 58 and the output 72 of multiplexer 58 becomes the value of register 60. The output of the comparator 64 also enables the update of register 60 at the end of the operation. The control input 46 disables the update of register 62 and selects the second input of multiplexer 56 which is the concatenation of input signal 44 and the output 72 of multiplexer 58 which is the value of register 60. The adder 54 adds the 64-bit concatenation of the 32-bit input signal 44 (high order bits of the concatenation) and the 32-bit value of register 60 to the 64-bit output 66 of the multiplier. The 32 high order bits of the result 68 are the output value 50. The 32 low order bits 70 of the result 68 are stored in register 60 at the end of the operation. The content of register 62 remains unchanged.

Extra control mechanisms like for example a valid flag for the cache entry or an initialization procedure may not be required.

For register extension caches with multiple cache entries, in addition to the extension and ID registers at least a valid flag may be required for each cache entry. An initialization procedure may invalidate all entries at system startup time. Various mechanisms are known (e.g. least recently used) of how to select the entry that is overwritten when a MULH instruction is executed.

In an embodiment the register extension cache may be provided with a number of entries that is equal to the number of general purpose registers. Each general purpose register may have assigned a particular extension register; the destination ID may not need to be stored and like in the single entry case no valid flags may be required.

The presented microprocessor may be arranged to perform an inverse discrete cosine transform (IDCT) calculation, for example the 8×8 points IDCT. Preferably, the number of precision-enhancement bits may be selected to allow for the inverse discrete cosine transform calculation having a precision according to IEEE-1180-1990 compliance test.

For example, some video codecs such as MPEG1, MPEG2, and MPEG4-SP/ASP issued by the Moving Picture Experts Group employ 8×8-point IDCT calculations for the decoding process. In software video decoders, IDCT calculations may have a high share of the overall processor load. The IEEE-1180-1990 compliance test specifies a minimum precision for the results of 8×8-point IDCT calculations used e.g. for MPEG video decoding. However, with 16-bit accumulation an IEEE-1180-1990 compliant IDCT output cannot be calculated. To be compliant, processors with 32-bit registers cannot use SIMD instructions at all and processors with 64-bit registers have to use 2-way SIMD instructions.

Figure 3:
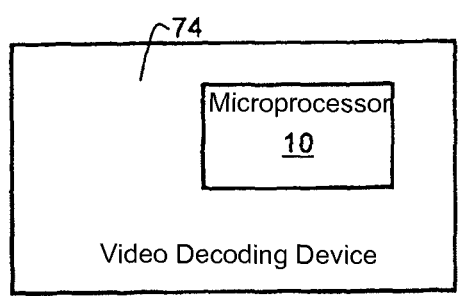
FIG. 3 shows a schematic example embodiment of a video decoding device according to the invention.

As shown in FIG. 3, a schematic example embodiment of a video decoding device 74 according to the invention may comprise a microprocessor 10 as described above. As an example, microprocessors according to the invention, having 32-bit registers may use 2-way SIMD instructions and processors with 64-bit may use 4-way SIMD instructions to calculate IEEE-1180-1990 compliant IDCTs without extending the programming model of a general purpose processor with additional registers or with wider registers.

Figure 4:
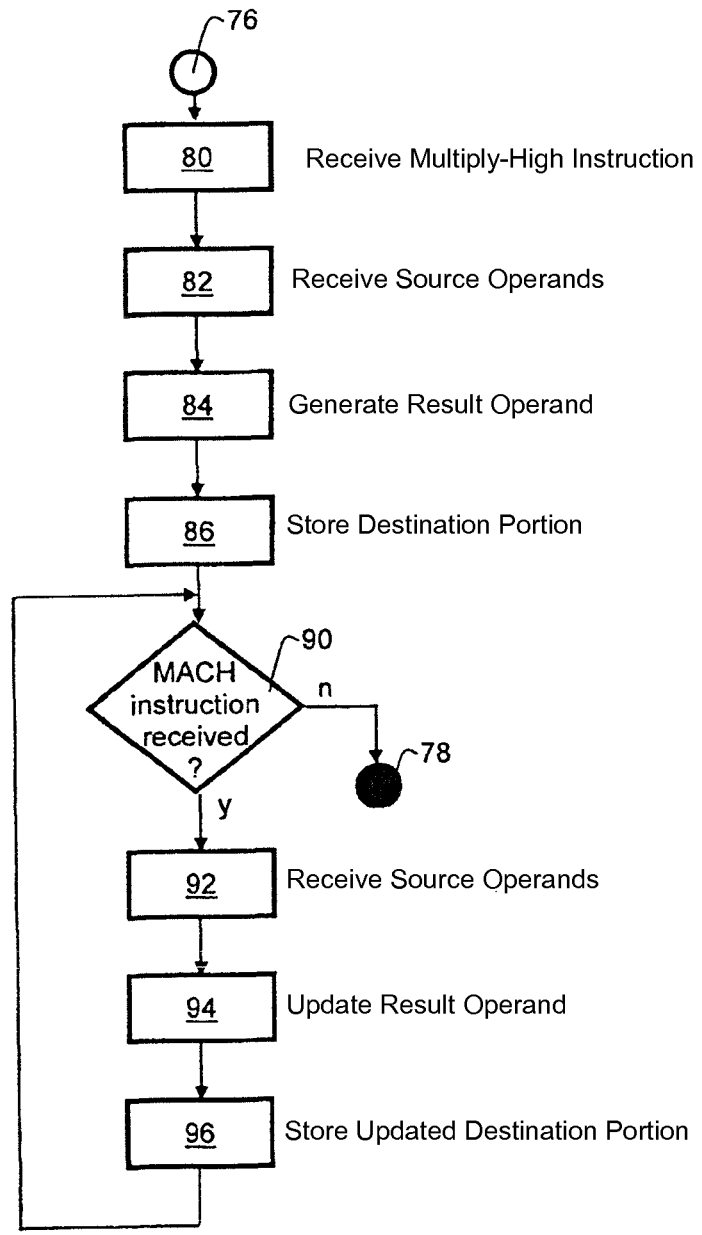
FIG. 4 shows a schematic example of a flow diagram of a first embodiment of a method for precision enhanced sum-of-products calculation according to the invention.

Referring now to FIG. 4, a schematic example of a flow diagram of a first embodiment of a method for precision enhanced sum-of-products calculation according to the invention is shown. The illustrated method allows implementing the advantages and characteristics of the described microprocessor as part of a method for enhanced precision sum-of-products calculation on a microprocessor. This refers to FIG. 5, too.

The diagram comprises a begin state 76 and an end state 78.

The method is for enhanced precision sum-of-products calculation on a microprocessor comprising at least one general-purpose register arranged to store and provide a number of destination bits to a multiply unit, and a register-extension cache comprising at least one cache entry arranged to store and provide a number of precision-enhancement bits. The method may comprise the steps of receiving 80 a multiply-high instruction; receiving 82 at least a first and a second source operand, each having an associated number of source bits and a sum of the associated numbers of source bits exceeding the number of destination bits; generating 84 a result operand by executing a multiply-high operation using the at least first and second source operands; storing 86 a destination portion of the result operand in the general-purpose-register and a precision-enhancement portion of the intermediate result operand in the cache entry; for each component of a multiply-high-and-accumulate sequence: receiving 90 a multiply-high-and-accumulate instruction; receiving 92 the at least first and second source operand; updating 94 the result operand by executing a multiply-high-and-accumulate operation using a sum of a new result operand generated from a multiply-high operation using the at least first and second source operands and a concatenation of a preceding destination portion previously stored in the at least one general-purpose-register and a corresponding preceding precision-enhancement portion previously stored in the at least one cache entry; and storing 96 an updated destination portion of the result operand in the general-purpose-register and an updated precision-enhancement portion of the result operand in the cache entry.

It should be noted that a source operand may have different values when processing different components of a sum-of-products. The received sequence of MACH instructions may be associated with the preceding MULH instruction. Steps 90, 92, 94, and 96 may be executed for all components of a sequence of MACH instructions. This may end when no more corresponding MACH instructions are received. Further, it should be noted that no a-priori knowledge of a length of a sum-of-products sequence, i.e. of the number of components of the sequence, may be required, therefore avoiding for example introduction of dedicated commands.

The method may further be applied to a microprocessor comprising a plurality of general-purpose-registers, each having a register identifier, and the register-extension cache comprises a plurality of the cache entries, each identified using a cache entry identifier corresponding to one of the register identifiers. The method may further comprise the steps of providing a destination identifier matching one of the register identifiers to the multiply unit; and generating the result operand using the destination portion and a precision enhancement portion provided by a cache entry having the cache entry identifier matching the destination identifier. And the step 86 of storing a destination portion of the result operand in the general-purpose-register and a precision-enhancement portion of the intermediate result operand in the cache entry comprises storing the destination portion in the general-purpose-register identified by the destination identifier.

Figure 5:
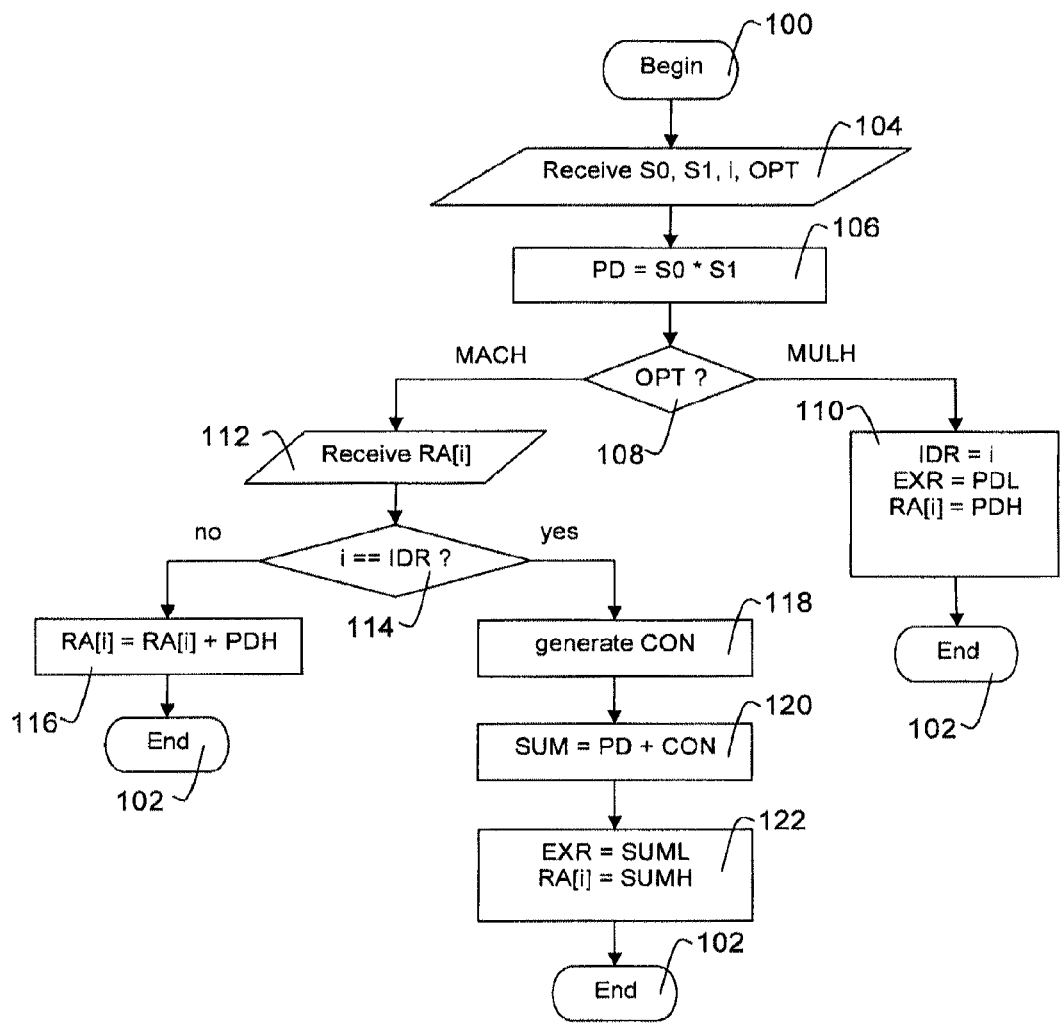
FIG. 5 shows a schematic example of a flow diagram of a second embodiment of a method for precision enhanced sum-of-products calculation according to the invention.

Referring to FIG. 5, a schematic example of a flow diagram of a second embodiment of a method for precision enhanced sum-of-products calculation according to the invention is shown.

The diagram comprises a begin state 100 and an end state 102.

In the shown example, a single entry register extension cache is used. In the description, the following register and variable names are used:

S0 source operand 0
S1 source operand 1
OPT operation type, a control value that defines whether a MULH or MACH operation is performed
RA register array
RA[i] $i_{th}$ register of the register array RA
i index of the $i_{th}$ register of the register array RA
EXR extension register
IDR ID register
PD product or negated product of source operands S0 and S1
PDL low order bits of the product PD
PDH high order bits of the product PD
CON concatenation of EXR (low order bits) and RA[i] (high order bits)
SUM sum of PD and CON
SUML low order bits of SUM
SUMH high order bits of SUM In step 104 the values S0, S1, i and OPT are received. In step 106 the product or negated product PD of the source operands S0 and S1 is calculated. Step 108 checks whether OPT defines a MULH or a MACH operation. In case of MULH the process continues with step 110. In case of MACH the process continues with step 112.

In step 110 the index i of the $i_{th}$ register RA[i] of the register array RA is stored in the ID register IDR. The low order bits PDL of the product PD are stored in the extension register EXR. The high order bits PDH of the product PD are stored in the $i_{th}$ register RA[i] of the register array RA. The process ends 102 after this step.

In step 112 the value of the $i_{th}$ register RA[i] of the register array RA is received. Step 114 checks whether the received index i is equal to the value of the ID register IDR. In case the received index i is different from the value of register IDR the process continues with step 116. In case the received index i equals the value of register IDR the process continues with step 118.

In step 116 the high order bits PDH of the product PD are added to the value of the $i_{th}$ register RA[i] of the register array RA. The result is stored in the same register RA[i]. The shown process may end 102 after this step.

In step 118 the concatenation CON of the value of the extension register EXR and the $i_{th}$ register RA[i] of the register array RA is generated. EXR are the low order bits of the concatenation and RA[i] are the high order bits of the concatenation.

In step 120 the sum SUM of the product PD and the concatenation CON is calculated. Due to the concatenation of EXR and RA[i] a carry that is generated by the addition of PDL and EXR is propagated to the sum of PDH and RA[i].

In step 122 the low order bits SUML of SUM are stored in the extension register EXR. The high order bits SUMH of SUM are stored in the $i_{th}$ register RA[i] of the register array RA. The process may end 102 after this step.

Further, a computer program product may comprise code portions for executing steps of a method as described above when run on a programmable apparatus. The computer program may be provided on computer readable media at least temporarily coupled to an information processing system.

It should be noted that boundaries between logic blocks are only for illustration and alternative embodiments may distribute functionality between logic blocks differently. The invention is not limited to physical devices implemented in hardware but can also be implemented in any programmable device able to perform the desired functions of a device by operating using program code. The specifications and drawings illustrate example embodiments and are not meant to restrict the invention to the shown examples. The word 'comprising' may not be interpreted as excluding the presence of other elements or steps than those mentioned in a claim.

While the invention has been described in terms of particular structures, devices and methods, those skilled in the art will understand based on the description herein that it is not limited merely to such examples and that the full scope of the invention is properly determined by the claims.

The invention claimed is:

1. A microprocessor, comprising:
a multiply unit;
at least one general-purpose-register arranged to store and provide a number of destination bits to said multiply unit;
a control unit adapted to provide at least a multiply-high instruction and a multiply-high-and-accumulate instruction to said multiply unit
wherein said multiply unit further is
arranged to receive at least a first and a second source operand, each source operand having an associated number of source bits and a sum of said associated numbers of source bits exceeding the number of destination bits;
connected to a register-extension cache comprising at least one cache entry arranged to store and provide precision-enhancement bits; and
adapted to store
a destination portion comprising high order bits of a result operand in said general-purpose-register and
a precision-enhancement portion comprising low order bits of said result operand in said cache entry; said result operand generated by a multiply-high operation when receiving said multiply-high instruction and by a multiply-high-and-accumulate operation when receiving said multiply-high-and-accumulate instruction,
wherein said multiply-high-and-accumulate operation comprises generating said result operand using a sum of an intermediate result operand generated from a multiply-high operation using said at least first and second source operands and a concatenation of a preceding destination portion previously stored in said at least one general-purpose-register and a corresponding preceding precision-enhancement portion previously stored in said at least one cache entry,
the microprocessor further comprising a plurality of general-purpose-registers, each having a register identifier, wherein said control unit is adapted to provide a destination identifier matching one of said register identifiers to said multiply unit, said multiply unit adapted to store said destination portion in said general-purpose-register identified by said destination identifier,
wherein said register-extension cache comprises a plurality of said cache entries, each identified using a cache entry identifier corresponding to one of said register identifiers and wherein said multiply unit is adapted to generate said result operand using said destination portion and a precision enhancement portion provided by a cache entry having said cache entry identifier matching said destination identifier.

2. The microprocessor as claimed in claim 1, wherein said sum of said associated numbers of source bits exceeds a sum of said number of destination bits and said precision-enhancement bits.

3. The microprocessor as claimed in claim 1, wherein said multiply-high-operation comprises a multiply-high-and-negate operation and said multiply-high-and-accumulate operation comprises a multiply-high-negate-and-accumulate operation.

4. The microprocessor as claimed in claim 1, wherein said multiply unit comprises said register-extension cache.

5. The microprocessor as claimed in claim 1, wherein said multiply-high operation and said multiply-high-and-accumulate operation are implemented as Single Instruction Multiple Data operations.

6. The microprocessor as claimed in claim 1, wherein the microprocessor is arranged to perform an inverse discrete cosine transform calculation.

7. The microprocessor as claimed in claim 6, wherein said number of precision-enhancement bits is selected to allow for said inverse discrete cosine transform calculation having a precision according to IEEE-1180-1990 compliance test.

8. A video decoding device comprising a microprocessor as claimed in claim 1.

9. A method for enhanced precision sum-of-products calculation on a microprocessor comprising a multiply unit, at least one general-purpose register arranged to store and provide destination bits to said multiply unit, and a register-extension cache comprising at least one cache entry arranged to store and provide precision-enhancement bits, said method comprising the steps of:

receiving a multiply-high instruction;

receiving at least a first and a second source operand, each source operand having an associated number of source bits and a sum of said associated numbers of source bits exceeding the number of destination bits;

generating a result operand by executing a multiply-high operation using said at least first and second source operands;

storing a destination portion comprising high order bits of said result operand in said general-purpose-register and a precision-enhancement portion comprising low order bits of said result operand in said cache entry;

for each component of a multiply-high-and-accumulate sequence receiving a multiply-high-and-accumulate instruction;

receiving said at least first and second source operand;

updating said result operand by executing a multiply-high-and-accumulate operation using a sum of a new result operand generated from a multiply-high operation using said at least first and second source operands and a concatenation of a preceding destination portion previously stored in said at least one general-purpose-register and a corresponding preceding precision-enhancement portion previously stored in said at least one cache entry; and storing an updated destination portion of said result operand in said general-purpose-register and an updated precision-enhancement portion of said result operand in said cache entry, wherein said microprocessor further comprises a plurality of general-purpose-registers, each having a register identifier, and said register-extension cache comprises a plurality of said cache entries, each identified using a cache entry identifier corresponding to one of said register identifiers; the method comprising the steps of:

providing a destination identifier matching one of said register identifiers to said multiply unit; and generating said result operand using said destination portion and a precision enhancement portion provided by a cache entry having said cache entry identifier matching said destination identifier;

wherein said step of storing a destination portion comprising the high order bits of said result operand in said general-purpose-register and a precision-enhancement portion comprising the low order bits of said result operand in said cache entry comprises storing said destination portion in said general-purpose-register identified by said destination identifier.

10. A computer program product comprising a tangible storage medium including a computer code for executing the steps of the method as claimed in claim 9.

\* \* \* \* \*